(12) United States Patent
Quix et al.

(10) Patent No.: US 10,767,539 B2
(45) Date of Patent: Sep. 8, 2020

(54) ARRANGEMENT AND METHOD FOR TEMPERING EXHAUST GAS RECIRCULATION DEVICES, AND MOTOR VEHICLE

(71) Applicant: Ford Global Technologies, LLC, Dearborn, MI (US)

(72) Inventors: Hans Guenter Quix, Herzogenrath (DE); Andreas Kuske, Geulle (NL); Christian Winge Vigild, Aldenhoven (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/393,661

(22) Filed: Apr. 24, 2019

(65) Prior Publication Data
US 2019/0331018 A1    Oct. 31, 2019

(30) Foreign Application Priority Data
Apr. 25, 2018  (DE) ........................ 10 2018 206 368

(51) Int. Cl.
*F01N 5/02*       (2006.01)
*F02B 29/04*      (2006.01)
*B60H 1/00*       (2006.01)

(52) U.S. Cl.
CPC ............ *F01N 5/02* (2013.01); *F02B 29/0418* (2013.01); *F02B 29/0437* (2013.01); *B60H 2001/00949* (2013.01); *F01P 2060/02* (2013.01)

(58) Field of Classification Search
CPC .... F01N 5/02; F02B 29/0418; F02B 29/0437; F01P 2060/02; B60H 2001/00949; F02M 26/13; F02M 26/21; F02M 26/23
See application file for complete search history.

(56) References Cited

U.S. PATENT DOCUMENTS

| | | | |
|---|---|---|---|
| 8,020,538 B2* | 9/2011 | Surnilla | F02M 26/47 123/568.12 |
| 8,365,527 B2* | 2/2013 | Raab | F02B 29/0412 60/599 |
| 8,763,376 B2* | 7/2014 | Garnepudi | F01P 3/20 123/41.05 |
| 8,960,166 B2 | 2/2015 | Styles et al. | |
| 2013/0139491 A1* | 6/2013 | Garnepudi | F01P 3/20 60/278 |
| 2014/0109880 A1* | 4/2014 | Styles | F01P 7/10 123/542 |
| 2014/0345579 A1 | 11/2014 | Keppy | |

(Continued)

FOREIGN PATENT DOCUMENTS

CN    105402071 A    3/2016
DE    102014209994 A1    12/2014
(Continued)

*Primary Examiner* — Hung Q Nguyen
(74) *Attorney, Agent, or Firm* — Geoffrey Brumbaugh; McCoy Russell LLP

(57) ABSTRACT

Methods and systems are provided for a tempering circuit. A system comprises where the tempering circuit is fluidly coupled to each of an engine cooling circuit, an EGR cooler, and an EGR valve. The tempering circuit comprising a plurality of control valves for selectively adjusting tempering medium flow to various portions of the tempering circuit.

20 Claims, 11 Drawing Sheets

(56) References Cited

U.S. PATENT DOCUMENTS

2015/0377180  A1*   12/2015   Jacquot .................. F02M 26/30
                                                                  60/320
2017/0058754  A1     3/2017   Hébert et al.

FOREIGN PATENT DOCUMENTS

DE         102017202128  A1    3/2018
JP            2006125215  A    5/2006
JP            2017129080  A    7/2017

* cited by examiner

ARRANGEMENT AND METHOD FOR TEMPERING EXHAUST GAS RECIRCULATION DEVICES, AND MOTOR VEHICLE

CROSS REFERENCE TO RELATED APPLICATION

The present application claims priority to German patent application No. 102018206368.0, filed on Apr. 25, 2018. The entire contents of the above-listed application are hereby incorporated by reference for all purposes.

FIELD

The present description relates generally to an arrangement and a method for tempering exhaust gas recirculation devices, and a motor vehicle.

BACKGROUND/SUMMARY

Internal combustion engines improvements continue to aim to increase energy efficiency, so that a smaller part of the chemical energy contained in the fuel is converted into thermal energy. One drawback to this strategy may include poorer warming behavior of the internal combustion engine after a cold start.

A cold internal combustion engine may lead to a higher fuel consumption because of increased internal engine friction and sub-optimal combustion process. In addition, the issue of condensation water may occur in the case of an external low-pressure exhaust gas recirculation device assigned to the internal combustion engine. Because the temperature falls below the dew point, an undesirable condensation can form, in particular in the low-pressure cooler for the low-pressure exhaust gas for recirculation (low-pressure EGR cooler) and in the low-pressure valve which controls the output of exhaust gas for recirculation to the intake air tract of the internal combustion engine (low-pressure EGR valve).

Here, firstly so-called free flow condensate may form when water contained in the warm or hot and damp recirculated low-pressure exhaust gas condenses when cooling on contact with cold fresh air. Initially small droplets agglomerate into larger droplets. If these larger droplets hit a rapidly rotating impeller, they may degrade (e.g., crack) blades thereof.

Secondly, so-called wall condensation occurs wherein the warm or hot recirculated low-pressure exhaust gas meets a cold wall, whereby the recirculated exhaust gas cools together with the water contained therein. If, for a given proportion of gaseous water, cooling occurs to a temperature below the dew point for this water proportion, condensation may result.

The condensation water occurring may enter the intake air tract of the internal combustion engine together with the recirculated low-pressure exhaust gas. If the condensate hits the impeller of the turbocharger, the condensation droplets can cause erosion of the compressor vanes since, because of their mass, they constitute an obstacle to the vanes at the compressor rotation speeds occurring. This wear has negative effects on the efficiency of the compressor, the fuel consumption, the emission of pollutants and the development of vibrations (NVH: noise, vibration, harshness). In addition, the condensation water may cause misfiring in petrol engines.

Therefore, it may be desired to reduce or eliminate the occurrence of condensation water upstream of the compressor.

One example approach to decrease condensate formation in the LP-EGR passage and/or LP-EGR cooler is shown by Hebert et al. in DE 102017202128. Therein, an exhaust heat recovery system comprises a first heat exchanger and a refrigerant circuit with coolant flowing therethrough. The exhaust heat recovery system may decrease condensate formation in parts of the LP-EGR system, such as the LP-EGR cooler. However, the exhaust heat recovery system fails to heat the EGR valve during an engine cold-start, which may still receive a considerable amount of condensate formation.

Another example approach is shown by Styles et al. in U.S. Pat. No. 8,960,166. Therein, coolant in a pre-compressor duct wall may be used to decrease condensate formation on a pre-compressor duct. The heated engine coolant may also pass through the EGR valve body. However, this coolant flow needs significant manufacturing and is not easily introduced onto current road-going vehicles.

The inventors have identified the above problems and come up with a way to at least partially solve them. In one example, the issues are addressed by a system, comprising a tempering circuit for flowing a tempering medium from a container to an engine cooling circuit, an EGR cooler, and an EGR valve. In this way, a cold-start duration of the engine may be reduced as may a likelihood of condensate formation in the EGR cooler and on the EGR valve.

As one example, the tempering circuit may be fitted with a plurality of control valves shaped to adjust tempering medium flow to various portions of the tempering circuit. By doing this, tempering medium flow to the EGR valve and the EGR cooler may be adjusted such that one or more other may be heated while the other is not. This may provide more rapid heating of one EGR component, which may further mitigate condensate formation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
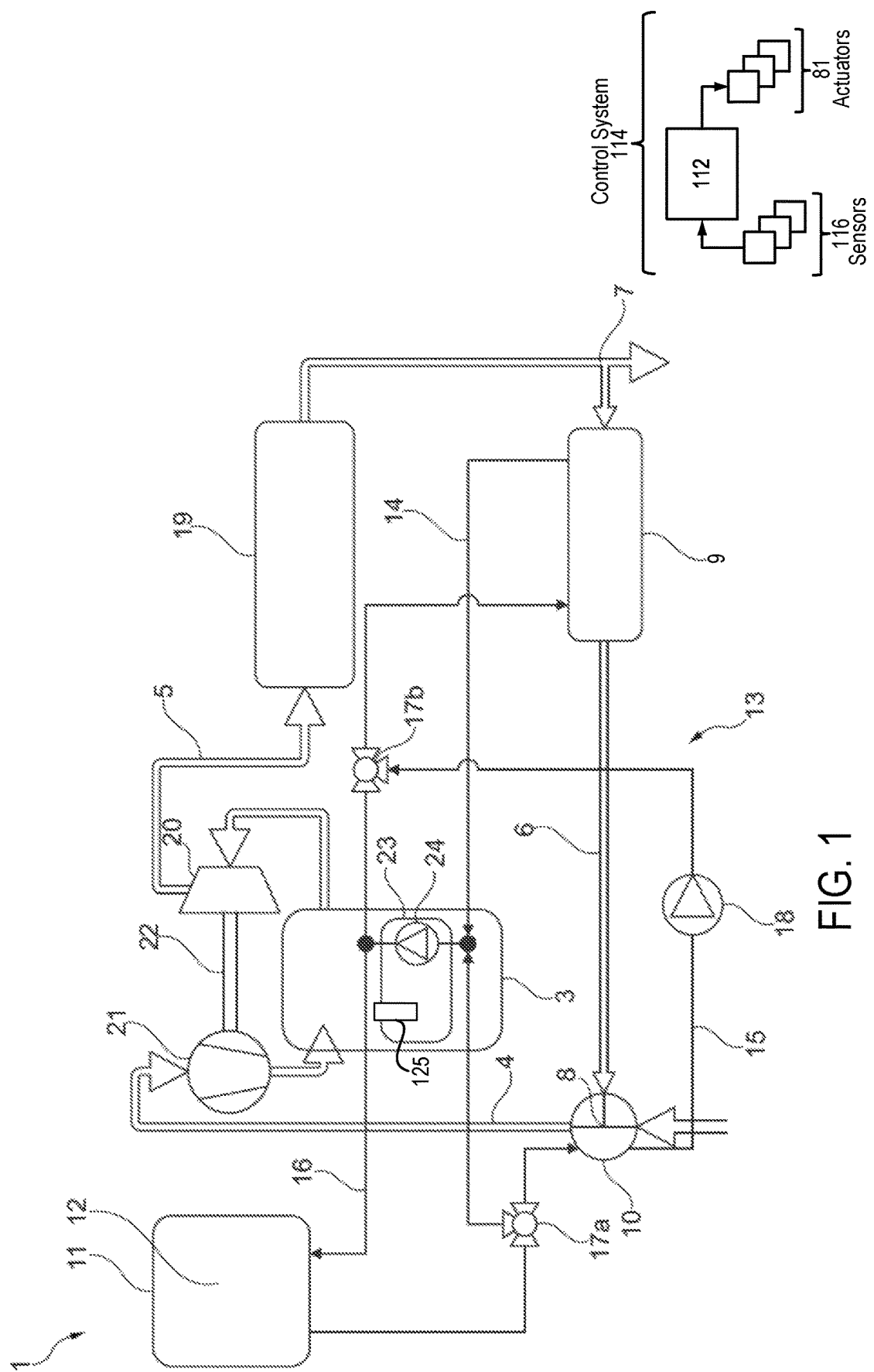
FIG. 1 shows a first exemplary arrangement with EGR valve and cooler arranged in series.

The following description relates to systems and methods for a tempering circuit for enhancing temperature control of an engine cooling circuit, an EGR cooler, and an EGR valve. An arrangement is shown in FIGS. 1-10 in variety of modes for cooling the EGR cooler and accelerating warm-up of one or more of an EGR valve, EGR cooler, and engine. FIG. 11 illustrates a method for selecting one of the plurality of modes of the arrangement based on at least an engine temperature.

The inventors have identified the above issues with regard to condensate and come up with a way to at least partially solve it while maintaining increased energy efficiency of the combustion engine. One method is to provide additional thermal energy on a cold start of the internal combustion engine, so that the low-pressure EGR cooler and/or the low-pressure EGR valve are heated and condensation can be reduced or even blocked from forming. Where the description below cites, describes or explains an exhaust gas recirculation system or an associated device, e.g. a cooler or EGR valve, this describes a low-pressure exhaust gas recirculation system, a low-pressure EGR cooler, a low-pressure EGR valve etc. unless specified otherwise.

In one example, the issues described above may be at least partially addressed by an arrangement according to the present disclosure for tempering exhaust gas recirculation devices comprising an internal combustion engine with an engine cooling system for tempering the internal combustion engine, an intake air tract for supplying intake air to the internal combustion engine, an exhaust gas tract for discharging exhaust gas from the internal combustion engine, and an exhaust gas recirculation tract configured to recirculate exhaust gas from an exhaust gas extraction point arranged in the exhaust gas tract to an exhaust gas introduction point arranged in the intake air tract.

The exhaust gas recirculation tract is configured as a low-pressure exhaust gas recirculation tract. Therefore, the exhaust gas extraction point is arranged in the exhaust gas tract downstream of the exhaust gas turbine of a turbocharger assigned to the internal combustion engine, and in some cases downstream of exhaust gas aftertreatment devices, while the exhaust gas introduction point in the intake air tract may be arranged upstream of the compressor of the turbocharger. The present disclosure is particularly advantageous in the case of a low-pressure exhaust gas recirculation system since here, because of the long flow paths compared to high-pressure exhaust gas recirculation, a particularly long time passes before the exhaust gas recirculation devices are adequately heated via the recirculated exhaust gas after a cold start of the internal combustion engine, and therefore an undesirable formation of condensation water may occur more frequently.

The arrangement according to the present disclosure furthermore comprises a container with a heat storage medium. A heat storage medium is a medium, e.g. a fluid, which can store thermal energy. Preferably, the heat storage medium has a high thermal capacity so that as much thermal energy as possible can be stored with a low mass of the heat storage medium. Optionally, the heat storage medium may be able to undergo chemical reactions and/or physical processes which are associated with heat absorption and/or heat emission. Preferably, such chemical reactions or physical processes may be reversible so that heat absorption or heat emission may take place repeatedly.

The heat storage medium may be arranged in a closed container, wherein the container is not restricted to a specific form and may comprise a variety of shapes. The volume of the container may be greater than the volume of the heat storage medium in order to be able to counter any thermal expansion of the heat storage medium. This may ensure that the heat storage medium does not escape the container (e.g. because of leakage).

Preferably, the container may consist of a material with high thermal conductivity to allow a desired transfer of heat between the heat storage medium present in the container and a tempering medium of a tempering circuit.

In addition, the arrangement according to the present disclosure has a tempering circuit through which tempering medium flows.

The tempering medium serves amongst others for indirect heat transmission between the heat storage medium and devices arranged in the tempering circuit. Firstly, at low temperatures, (e.g. before, after, and/or during a cold start of the internal combustion engine), the tempering medium can absorb thermal energy from the heat storage medium, (e.g. using the thermal conductivity of the container). Then the heated tempering medium may emit thermal energy to the exhaust gas recirculation devices arranged in the tempering circuit. Also, the tempering medium can absorb thermal energy from the internal combustion engine and transmit this to the heat storage medium.

The tempering medium may for example comprise or consist of water.

Because of the use of tempering medium, there is no need for the heat storage medium to be transported between different cavities. The risk of undesirable escape of the heat storage medium may thereby be reduced. Also, the container with the heat storage medium can easily be integrated into existing heat management systems, so that for example aftermarket fitting is possible.

The tempering circuit may be formed by lines, (e.g. pipes or hoses), containing the tempering medium. Because of the arrangement of devices in the tempering circuit, (e.g. the engine cooling system, the exhaust gas recirculation devices or the container), heat transmission is possible between the corresponding components and the tempering medium, (e.g. in that the lines are in direct contact with the devices or tempering medium flows around the devices). To increase the heat transmission, the tempering circuit may comprise devices for increasing the heat transmission, (e.g. rib-like or meandering structures for increasing the surface area, thermally conductive materials, and the like). A tempering medium stream may be formed in the tempering circuit by temperature differences.

The tempering circuit has partial circuits which are described below and which may be used depending on the tempering demand. The partial circuits partly overlap, (i.e. lines of the tempering circuit are partially used to form different partial circuits). In other words, the circuits described are not separate from each other.

According to the present disclosure, the engine cooling system of the internal combustion engine and the cooler are arranged in a base circuit of the tempering circuit. In other words, the tempering medium in the base circuit flows from the cooler to the engine cooling system and back. This base circuit may for example be active alone if cooling of the exhaust gas for recirculation and hence of the cooler is desired. For this, the tempering medium in the engine cooling circuit is cooled and the cooled tempering medium supplied to the cooler where it can absorb thermal energy from the cooler. In other words, the coolant of the engine cooling system may be the tempering medium, or the engine cooling system may be extended into the base circuit. The term "base circuit" expresses the fact that this is the partial circuit of the tempering circuit which is activated during a plurality of conditions, including outside of a cold-start, for traditional cooling, (i.e. under normal operating conditions of the internal combustion engine).

The engine cooling system may have a pumping device, such as a water pump, which may be used to create a flow in the engine cooling system and hence also in the base circuit. Via the water pump, a higher pressure may be formed in the lines leaving the water pump than in the return lines feeding liquid to the water pump.

The tempering circuit furthermore comprises a heating circuit. The container with the heat storage medium, the engine cooling system, the cooler, and the EGR valve are arranged in the heating circuit. The heating circuit serves for heating the cooler and/or the EGR valve, (e.g. during a cold start of the internal combustion engine), wherein thermal energy is transmitted from the heat storage medium to the EGR valve and/or the cooler.

Furthermore, the tempering circuit comprises a storage circuit. The container and the engine cooling system are arranged in the storage circuit. To this extent, the engine cooling system is part of both the base circuit and the heating circuit and of the storage circuit. Similarly, the container is part of the heating circuit and of the storage circuit.

The storage circuit serves to transmit thermal energy from the internal combustion engine or the engine cooling system to the heat storage medium. In other words, using the storage circuit, thermal energy may be supplied to the heat storage medium and stored therein for later use in the heating circuit. In this way, an additional cooling effect for the internal combustion engine may be achieved.

The arrangement according to the present disclosure furthermore comprises through-flow control devices which are configured to divide the tempering medium stream to the base circuit, the heating circuit and the storage circuit. In other words, by controlling the through-flow control devices accordingly, it can be determined whether the tempering medium flows through the base circuit, the heating circuit and/or the storage circuit. The through-flow control devices may for example be configured as three-way valves.

The disclosure advantageously allows tempering, in particular heating after a cold start of the internal combustion engine, of the cooler and EGR valve forming the exhaust gas recirculation devices. The formation of condensation water may thereby be reduced or even prevented so that no condensation water, or only very small quantities, can pass from the exhaust gas recirculation tract into the intake air tract. Erosion of the compressor vanes of the impeller caused by condensation water, and the resulting negative effects on the efficiency of the compressor, the fuel consumption, the emission of pollutants and the vibration development, may be reduced or prevented. Also, in the case of a petrol engine as an internal combustion engine, misfiring of the internal combustion engine due to condensation water may be minimized or blocked.

Furthermore, advantageously, no additional energy supply is required for tempering the exhaust gas recirculation devices, i.e. the tempering does not have a disadvantageous effect on fuel consumption for example. The arrangement according to the disclosure in fact allows storage of thermal energy in the heat storage medium if sufficient thermal energy is available, i.e. after the internal combustion engine has reached its operating temperature. This stored thermal energy may then be used at a later time for heating the exhaust gas recirculation devices.

In addition, the tempering circuit and/or the container may also be integrated in further tempering circuits, (e.g. for tempering exhaust gas aftertreatment devices).

The cooler and the EGR valve may be arranged in the heating circuit either successively in series or in parallel to each other relative to the flow path of the tempering medium.

A parallel arrangement may allow independent tempering of the cooler and EGR valve since the tempering medium stream is divided accordingly. To divide the tempering medium stream, through-flow control devices (e.g. three-way valves) may be used. Use of three-way servo valves may allow step-less volume division of the tempering medium stream.

An arrangement successively in series, in comparison with a parallel arrangement, allows simpler technical implementation since there are no corresponding branches and through-flow control devices for dividing the tempering medium stream between the cooler and EGR valve. Thereby decreasing a packaging constraint and cost to manufacture the arrangement.

According to further variant embodiments, the heat storage medium may be a latent heat storage medium. It is also conceivable that the tempering medium is used as a heat storage medium. In this case, the container may be configured as an insulated container.

Phase change materials (PCM) in which the latent melt heat, dissolution heat or absorption heat is greater than the heat which they can store because of their normal specific thermal capacity, are used as latent heat storage media. As well as the specific thermal capacity, therefore, the latent heat of the phase transition, e.g. from liquid to solid, is available for storage of thermal energy.

Preferably, a latent heat storage medium may be used in which the phase transition from liquid to solid and vice versa, (i.e. solidifying or melting), is utilized. The phase transition temperature of the solid-liquid phase transition may occur in a temperature range between 50° C. and 80° C.

Suitable latent heat storage media may for example be salt hydrates, mixtures of salt hydrates or paraffins. In one example, sodium acetate trihydrate may be used as a latent heat storage medium as it comprises a phase transition temperature of 58° C. for the solid-liquid phase transition, but may be present in the liquid state as a sub-cooled melt in a metastable state even at lower temperatures of down to −20° C. since the salt dissolves in its crystal water. If crystallization is triggered, the latent heat storage medium warms again to the phase transition temperature of the solid-liquid phase transition and emits thermal energy.

The melt heat associated with the solid-liquid phase transition is around 270 kJ/kg and is therefore greater than with most other latent heat storage media with a solid-liquid phase transition temperature in the low temperature range between 40° C. and 100° C. In other words, the storable energy per kilogram is particularly high for sodium acetate trihydrate, so little latent heat storage medium is used to store a specific quantity of thermal energy, so the container for storing the sodium acetate trihydrate may be selected correspondingly small. In this way, for example, installation space may be saved in a vehicle provided with the arrangement according to the disclosure.

Further examples of latent heat storage media are sodium sulfate decahydrate (solid-liquid phase transition temperature 32.5° C.), dipotassium hydrogen phosphate hexahydrate (solid-liquid phase transition temperature 14° C.), and calcium nitrate tetrahydrate (solid-liquid phase transition temperature 43° C.).

According to various embodiment variants, the latent heat storage medium may be present in a metastable state below its phase transition temperature (e.g. below the solid-liquid phase transition temperature).

Therefore, a latent heat storage medium may be used which may be present in a metastable state as a sub-cooled melt or sub-cooled solution. The phase transition from liquid to solid with the emission of thermal energy may be triggered by nucleation in the sub-cooled melt or solution, (e.g. via a pulse or inoculation with nuclei). In this way, advantageously, the time of the phase transition and hence the start of the heat output can be controlled.

For example, the latent heat storage medium may cool to ambient temperature without crystallization occurring, since the latent heat storage medium is in a metastable state at ambient temperature.

Preferably, the metastable state is present down to a lower temperature limit of 0° C., further preferably to a lower temperature limit of −10° C., particularly preferably to a lower temperature limit of −20° C., or even to a lower temperature limit of −30° C. In this way, heat emission is possible until said lower temperature limits are reached.

According to further embodiment variants, a pumping device may be arranged in the heating circuit.

The pumping device may preferably be driven electrically. It allows formation of a tempering medium stream in the heating circuit without a prevailing downward temperature gradient. For example, the pumping device may allow preheating of the exhaust gas recirculation devices and also of the internal combustion engine (by heating of the engine cooling system) before the internal combustion engine is started.

According to further embodiment variants, the arrangement may comprise temperature sensors for determining the temperature of the cooler and/or of the EGR valve and/or of the internal combustion engine.

For example, the temperature sensors may be arranged directly in or on such devices. Alternatively, temperature sensors may be arranged in the tempering medium, for example directly upstream or downstream of the device whose temperature is to be determined. The temperature of the device may be derived from the temperature of the tempering medium. The temperature of the internal combustion engine may for example be determined from the temperature of the tempering medium in the engine cooling system.

Determining the temperature allows control of the arrangement according to the disclosure as a function of temperature. If it is established for example that the temperature of the EGR valve is too low, i.e. there is a risk of undesirable condensation, the EGR valve may be heated.

The arrangement according to the disclosure may be controlled via a control unit which is configured to output control signals to the through-flow control devices depending on the temperature of the cooler and/or the temperature of the EGR valve and/or the temperature of the internal combustion engine. For example, control may take place according to the method of the disclosure explained below.

The control unit may receive input data from the temperature sensors, process the input data and send control signals to actuators, (e.g., the through-flow control devices), in response to the processed input data, based on instructions or code programmed therein and following one or more routines.

The control unit may be implemented in the form of hardware and/or software and be physically configured as one piece or several pieces. In particular, the control unit may be part of an engine control system or be integrated therein. In a typical embodiment, the engine control system of a motor vehicle functions as the control unit.

A motor vehicle according to the disclosure comprises an arrangement as described above. Furthermore, the statements above explaining the arrangement according to the disclosure also serve to describe the motor vehicle according to the disclosure. The advantages of the motor vehicle according to the disclosure correspond to those of the arrangement according to the disclosure and its corresponding embodiment variants.

A motor vehicle is a vehicle powered by an engine, (e.g. a land-based craft, an aircraft or water-based craft), in particular a car.

A method according to the disclosure for tempering exhaust gas recirculation devices of an arrangement as described above comprises formation of a tempering medium stream in the base circuit when cooling of the cooler is desired, and formation of a tempering medium stream in the heating circuit when heating the cooler and/or the EGR valve is desired.

Cooling of the exhaust gas for recirculation and hence also of the cooler may be desired once the internal combustion engine has reached its desired operating temperature. In this case, a tempering medium stream is formed in the base circuit. In one example, the tempering medium stream is formed only in the base circuit such that the tempering medium flows from the cooler to the engine cooling system and back again without flowing to another circuits able to receive the tempering medium.

If, however it is desired to heat the cooler and/or the EGR valve, (e.g. in order to block the condensation of water contained in the exhaust gas for recirculation after a cold start of the internal combustion engine), the tempering medium stream is formed in the heating circuit. In other words, the tempering medium flows through the engine cooling system, the container with the heat storage medium, and the EGR valve and/or the cooler if these are arranged in series in the heating circuit. If the EGR valve and cooler are arranged in parallel in the heating circuit, it is also possible to heat only the EGR valve or only the cooler by adjusting a position of corresponding valves.

Here, heat from the heat storage medium may be transferred to the tempering medium, transported to the EGR valve and/or the cooler, and there transferred to the EGR valve or cooler. Also, the engine cooling system and hence the internal combustion engine may be heated.

Preferably, the tempering medium stream is formed such that the tempering medium coming from the container with the heat storage medium, (e.g. the warmed tempering medium), first flows through and heats the EGR valve and/or the cooler, and only thereafter does tempering medium also flow through the engine cooling system which is thus heated.

With the method according to the disclosure, the effects already described in relation to the arrangement may be achieved, so the advantages of the method according to the disclosure correspond to the advantages of the arrangement according to the disclosure and its embodiment variants.

According to various embodiment variants, the method may comprise formation of a tempering medium stream in the storage circuit when a minimum temperature of the internal combustion engine is reached.

With these embodiment variants, surplus thermal energy from the internal combustion engine can be supplied to the heat storage medium and stored therein, in that thermal energy is transferred from the internal combustion engine via the engine cooling system to the tempering medium, transported to the container and transferred to the heat storage medium. In this way, on a subsequent cold start, thermal energy may again be output by the heat storage medium and made available for heating the exhaust gas recirculation devices.

According to various embodiment variants, the tempering medium stream may be divided to the cooler and the EGR valve when heating of the cooler and/or of the EGR valve is desired. For this, the EGR valve and the cooler may be arranged in parallel to each other in the heating circuit. Thus, advantageously, a demand-led tempering of the EGR valve and cooler may take place.

According to further embodiment variants, the tempering medium stream, in particular the tempering medium stream in the heating circuit, may be formed via a pumping device. This may allow heating of the exhaust gas recirculation devices even before the internal combustion engine starts, so that condensation may be prevented or at least reduced from the moment of engine start.

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In the figures, all devices through which gases such as intake air, exhaust gas, and recirculated exhaust gas, flow are depicted with double lines. Devices through which fluids, such as the tempering medium, flow are shown as single lines. Dotted portions represent inactive portions of the tempering circuit.

Turning now to FIG. 1, it shows a first exemplary arrangement 1 for tempering exhaust gas recirculation devices 2. The arrangement 1 has an internal combustion engine 3 which is supplied with intake air via an intake air tract 4. Exhaust gas generated by the internal combustion engine 3 during the combustion process is discharged via an exhaust gas tract 5 which is connected to the internal combustion engine 3. Optionally, exhaust gas aftertreatment devices 19, which may include one or more of catalytic converters and particle filters, may be arranged in the exhaust gas tract. A turbocharger is also assigned to the internal combustion engine 3 and has a compressor 21 arranged in the intake air tract 4 and an exhaust gas turbine 20 arranged in the exhaust gas tract 5, which are connected together via a turbocharger shaft 22.

An internal combustion engine, is an internal combustion machine for converting chemical energy contained in fuel into mechanical work. The internal combustion engine may be self-ignited or externally ignited. The fuel may for example be petrol or diesel. Optionally, exhaust gas aftertreatment devices e.g. catalytic converters may be arranged in the exhaust gas tract. Additionally or alternatively, in some embodiments, the internal combustion engine may be arranged on a hybrid vehicle. As such, the mechanical work provided by the engine may be combined with converted electrical energy from an electric motor to propel a vehicle. Said another way, chemical energy and electrical energy may be converted into mechanical energy to propel a vehicle on the hybrid vehicle.

The term "intake air" in this context means a composition comprising fresh air such as externally supplied air, and in some cases recirculated exhaust gas, which is supplied to the internal combustion engine for performance of the combustion process.

According to the disclosure, a cooler is arranged in the exhaust gas recirculation tract for cooling the recirculated exhaust gas. The arrangement also comprises a valve for controlling the composition of a mixture of fresh air and recirculated exhaust gas forming the intake air. This valve is also called an EGR valve (EGR: exhaust gas recirculation). The EGR valve may be arranged downstream of the cooler on the gas side, for example at the point of introduction of the recirculated exhaust gas into the fresh air. Alternatively, the EGR valve may be arranged upstream of the cooler, e.g. at the exhaust gas extraction point. An EGR valve arranged upstream of the cooler, i.e. on the hot side of the cooler, also benefits from tempering, at least under certain conditions e.g. after cold start of the internal combustion engine. The cooler and the EGR valve are exhaust gas recirculation devices which are to be tempered in the context of the disclosure, i.e. cooled or heated as required.

The arrangement 1 furthermore comprises a low-pressure exhaust gas recirculation tract 6 which is configured to conduct exhaust gas from an exhaust gas extraction point 7 arranged in the exhaust gas tract 5 to an exhaust gas introduction point 8 arranged in the intake air tract 4. The exhaust gas extraction point 7 is arranged downstream of the exhaust gas turbine 20 and downstream of any exhaust gas aftertreatment devices 19 which may be present, while the exhaust gas introduction point 8 is arranged upstream of the compressor 21.

Herein, upstream and downstream may refer to relative positioning of components relative to a fixed location or to a direction of gas flow. For example, a first component upstream of a second component in the exhaust gas tract may include where the first component receives exhaust gas before the second component.

The low-pressure exhaust gas recirculation tract 6 contains a cooler 9 for cooling the exhaust gas to be recirculated. Furthermore, an EGR valve 10 is arranged at the exhaust gas introduction point 8, via which the proportion of exhaust gas to be recirculated can be set so that a desired composition of the intake air comprising fresh air and recirculated exhaust gas is achieved. In this way, the EGR valve 10 is arranged downstream of the cooler 9. As such, the cooler 9 receives exhaust gas prior to the EGR valve 10. It will be appreciated that a bypass passage may bypass the cooler 9 such that exhaust gas may flow directly to the EGR valve 10 without flowing through the cooler 9.

In addition, the arrangement 1 comprises a container 11 with a heat storage medium 12, wherein the heat storage medium 12 is a latent heat storage medium.

Also, the arrangement 1 comprises a tempering circuit 13 through which a tempering medium flows. The tempering circuit 13 comprises a base circuit 14, a heating circuit 15 and a storage circuit 16. To divide the tempering medium stream to the base circuit 14, the heating circuit 15 and the storage circuit 16, through-flow control devices 17a, 17b are provided which are configured as three-way valves. By corresponding adjustment of the three-way valves, it can be determined whether the tempering medium flows through the base circuit 14 or through the heating circuit 15 or through the storage circuit 16. It can also be determined that the tempering medium flows through the base circuit 14 and the storage circuit 16. The division of the tempering medium stream to the base circuit 14, the heating circuit 15 and the storage circuit 16 is defined via the through-flow control devices 17a, 17b.

Control system 114 is shown receiving information from a plurality of sensors 116 (various examples of which are described herein) and sending control signals to a plurality of actuators 81 (various examples of which are described herein). As one example, sensors 116 may include temperature sensors arranged in various locations of the exhaust gas tract 5, EGR tract 6, engine coolant jacket, and the like. Other sensors such as additional pressure, temperature, air/fuel ratio, and composition sensors may be coupled to various locations in the arrangement 1. As another example, the actuators may the through-flow control devices 17a, 17b. Herein, the through-flow control devices 17a, 17b may be referred to as first control valve 17a and second control valve 17b.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

The engine cooling system 23 and the cooler 9 are arranged in the base circuit 14. The container 11 with its heat storage medium 12, the cooler 9, the EGR valve 10 and the engine cooling system 23 are arranged in the heating circuit 15. The container 11 and the engine cooling system 23 are arranged in the storage circuit 16. It is evident that the partial circuits at least partially overlap, as evident from FIGS. 2, 3 and 4 which each show one of the partial circuits as active.

Figure 2:
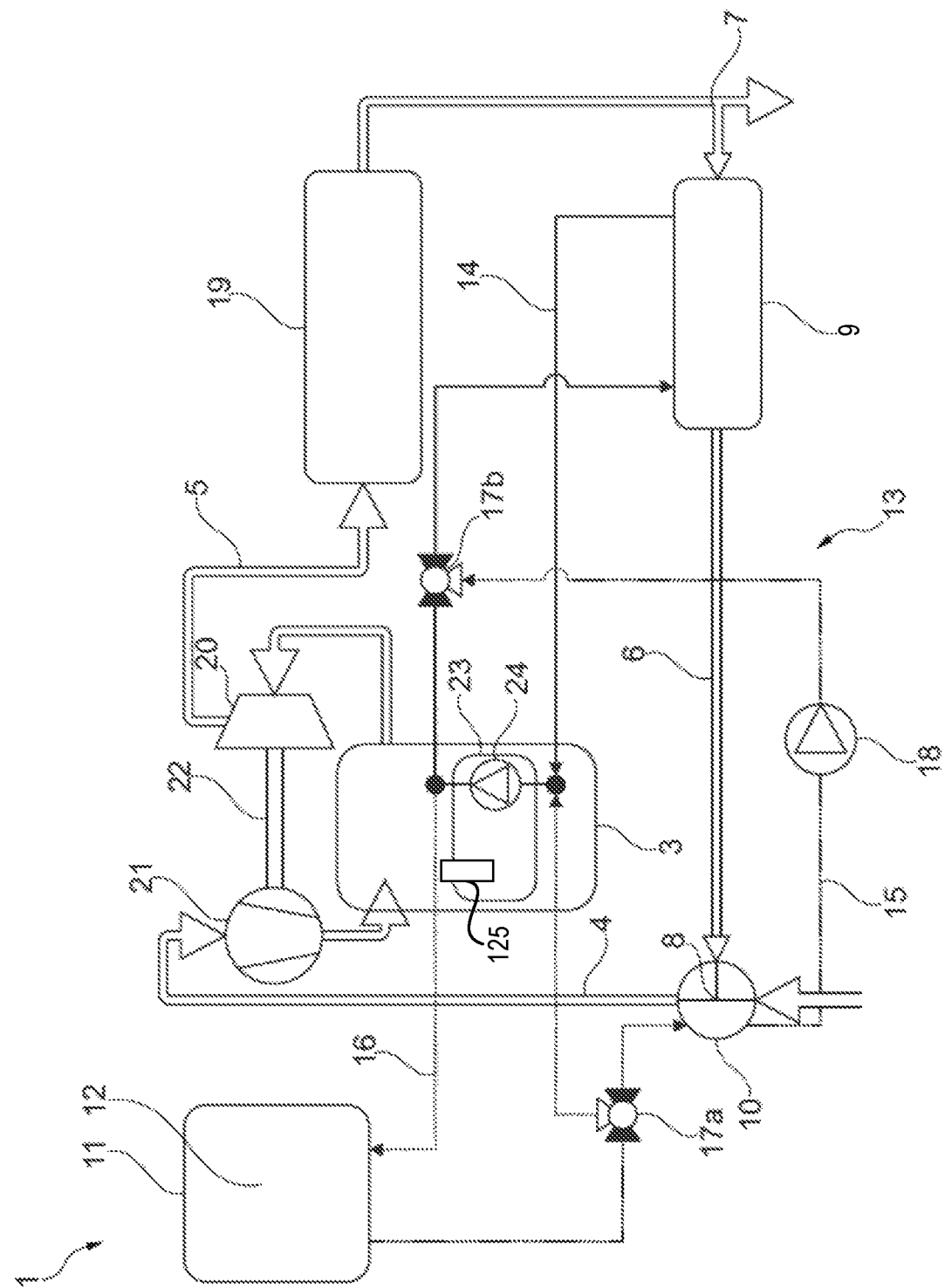
FIG. 2 shows the first exemplary arrangement in a cooling mode.
Figure 3:
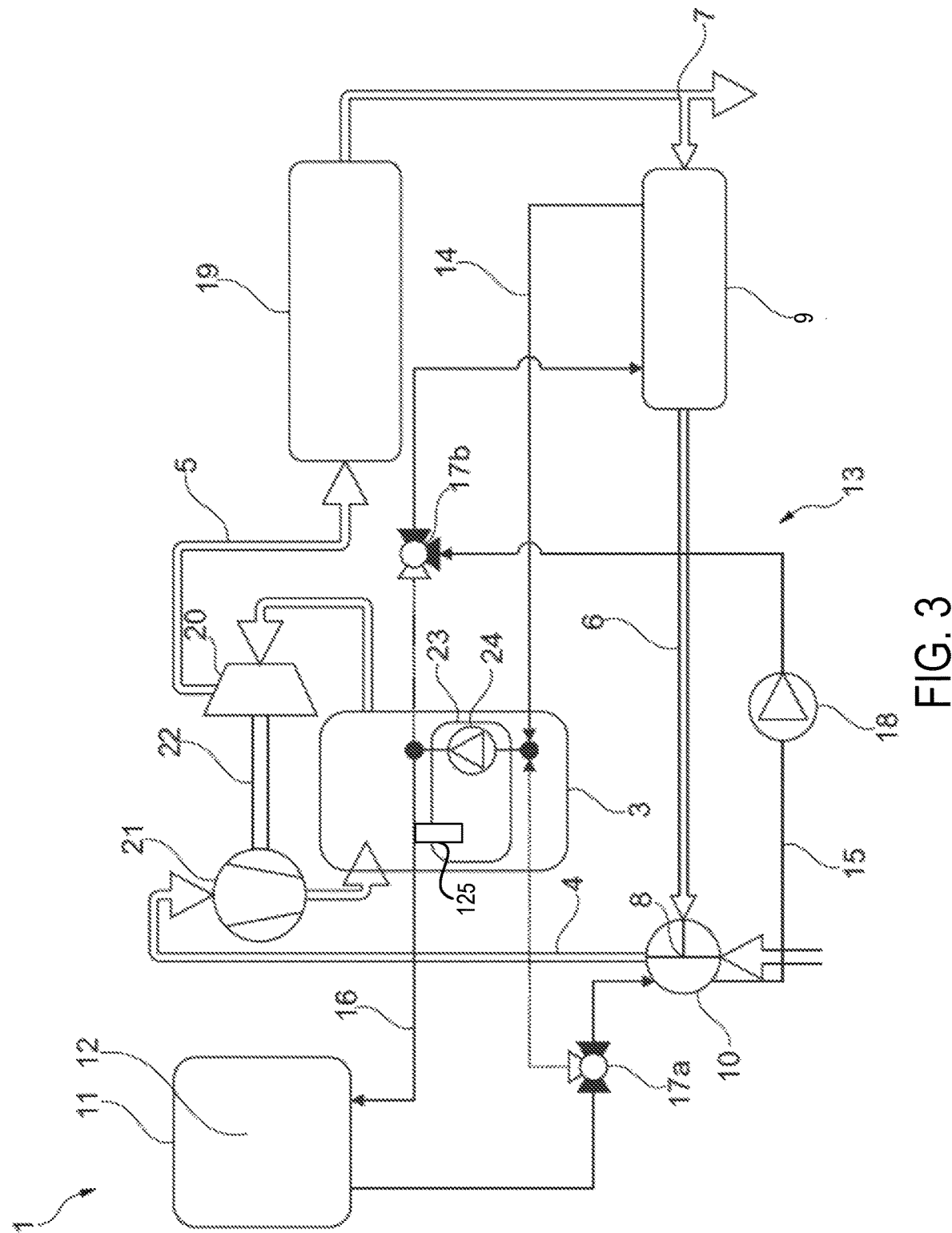
FIG. 3 shows the first exemplary arrangement in a heating mode.
Figure 4:
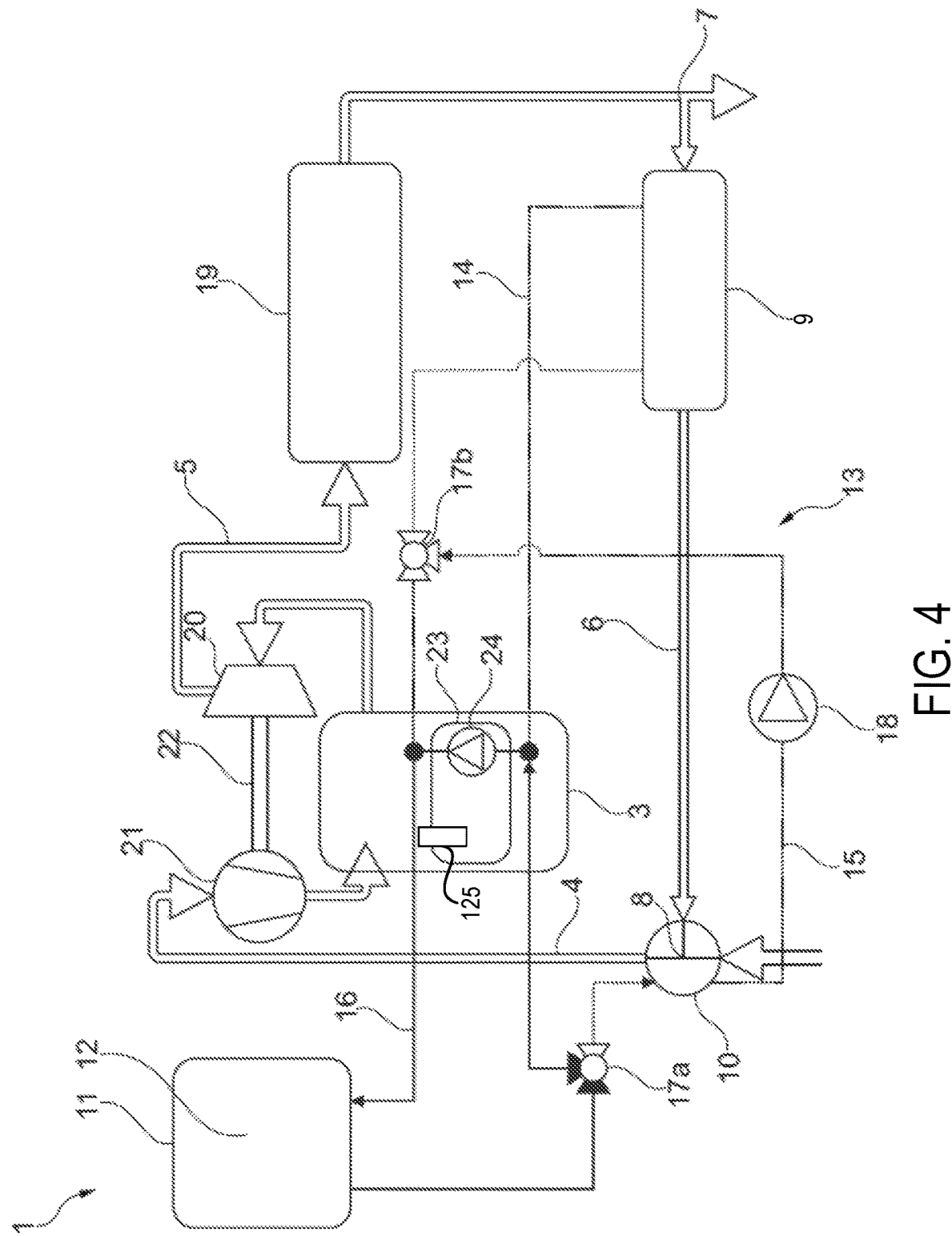
FIG. 4 shows the first exemplary arrangement in a heat storage mode.

Said another way, FIGS. 2, 3, and 4 illustrate the tempering circuit 13 in different operating modes, the different operating modes differentiated by different positions of the first and second control valves 17a, 17b such that tempering medium flow to the base circuit 14, heating circuit 15, and storage circuit 16 are adjusted.

In the exemplary embodiment shown in FIG. 1, the EGR valve 10 and the cooler 9 are arranged successively in series in the heating circuit 15. If therefore tempering medium flows through the EGR valve 10, the tempering medium also flows through the cooler 9.

Furthermore, an electric pump is also provided in the heating circuit 15 as a pumping device 18. The pumping device 18 allows formation of the tempering medium stream in the heating circuit 15 even before the internal combustion engine 3 starts, and hence early tempering of the cooler 9 and EGR valve 10.

The engine cooling system 23 has a water pump 24, via which a flow can be created in the engine cooling system 23 and hence also in the base circuit 14, the heating circuit 15 and/or the storage circuit 16. The lines shown leaving the engine cooling system 23 are connected to the outlet from the water pump 24, so that a higher pressure always prevails therein than in the return lines leading to the engine cooling system 23.

The engine cooling system 23 further comprises a temperature sensor 125 which may provide feedback to the controller 112. Feedback from the temperature sensor 125 may be used to estimate a temperature of other components of the arrangement 1, including the cooler 9, EGR valve 10, and the heat storage medium 12. First control valve 17a and second control valve 17b may receive signals from the controller 112 to adjust positions thereof in response to a temperature sensed by the temperature sensor 125.

Optionally, the arrangement 1 may comprise temperature sensors for determining the temperature of the cooler 9 and/or the EGR valve 10 and/or the internal combustion engine 3, and a control unit configured to output control signals to the through-flow control devices 17a, 17b depending on the temperature of the cooler 9 and/or the temperature of the EGR valve 10 and/or the temperature of the internal combustion engine.

Turning now to FIG. 2, it shows the arrangement 1 of FIG. 1 in a cooling mode, wherein the cooling mode occurs during operation of the internal combustion engine 3 where a desired engine operating temperature is reached and EGR cooling is desired. As such, components previously introduced may be similarly numbered in this figure and subsequent figures. For this, only the base circuit 14 is activated. In other words, a tempering medium stream is formed in the base circuit and thermal energy is exchanged only between the engine cooling system 23 and the cooler 9. The tempering medium flows from the engine cooling system 23 through the through-flow control device 17b to the cooler 9, and from there back to the engine cooling system 23.

Said another way, the cooling mode may include where the temperature medium flows from only the engine cooling system 23 to the cooler 9 and vice-versa. As such, the second control valve 17b may be adjusted to a position to allow tempering medium flow from the engine cooling system 23 to the cooler 9 while blocking tempering medium flow from the engine cooling system 23 to the heating circuit 13. Furthermore, the first control valve 17a is adjusted to a position to block tempering medium flow from the container 11 to the EGR valve 10. In the cooling mode, EGR may flow to intake gas tract 4, where the EGR may mix with exhaust gas.

Turning now to FIG. 3, it shows the arrangement 1 of FIG. 1 in a heating mode for heating the EGR valve 10 and the cooler 9. Such a heating mode may be selected for example immediately before or after a cold start of the internal combustion engine 3, in order to heat the exhaust gas recirculation devices 2 and reduce or block the formation of condensation water. In heating mode, it is desired to heat the cooler 9 and EGR valve 10, the tempering medium stream is formed in the heating circuit 15. The tempering medium flows from the container 11 via the first through-flow control device 17a to the EGR valve 10, from there via the pumping device 18 and the second through-flow control device 17b to the cooler 9, and from the cooler 9 via the engine cooling system 23 back to the container 11.

Here, thermal energy is transferred from the heat storage medium 12 to the tempering medium so that the tempering medium warms up. The warmed tempering medium flows through the EGR valve 10, the cooler 9 and the engine cooling system 23 before it returns to the container 11, where it can again absorb thermal energy from the heat storage medium 12.

As described above, the heat storage medium 12 may be a phase-change material (PCM) configured to receive or radiate heat. In the example of the heating mode, the PCM may solidify, such that heat is radiated from the PCM to the tempering medium. As described above, the tempering medium may be water, coolant, or the like. The PCM and the tempering medium may be separated from one another when the tempering medium flows to the container 11 via a thermally conductive material. That is to say, the PCM and tempering medium may be in thermal communication with one another without directly contacting one another. As such, the PCM (heat storage medium 12) does not escape the container 11 while the tempering medium may flow in and out of the container 11.

When the internal combustion engine 3 reaches a minimum temperature, (e.g. its operating temperature), the tempering medium stream may be formed in storage circuit 16 as shown in FIG. 4. The tempering medium flows from the engine cooling system 23 to the container 11 and via the first through-flow control device 17a back to the engine cooling system. Here, thermal energy is transferred from the warmed engine cooling system 23 to the tempering medium. The warmed tempering medium flows to the container 11 and may in turn transfer thermal energy to the heat storage medium 12. In other words, the heat storage medium 12 may be recharged so that thermal energy is again available for heating the exhaust gas recirculation devices 2 for a subsequent cold start.

During the heating mode of FIG. 3, the first control valve 17a is positioned to permit tempering medium to flow from the container 11 to the EGR valve 10 via the heating circuit 15. The tempering medium flows through the pump 18, where the tempering medium is further directed to the cooler 9. From the cooler 9, the tempering medium may be redirected back to the container 11, where the tempering medium may be heated by the heat storage medium 12. As such, during the heating mode, tempering medium in the engine cooling system 23 is directed to only the container 11. Furthermore, during the heating mode, tempering medium flows to the EGR valve 10 first, where the EGR valve 10 is warmed-up, and then the tempering medium flows to the cooler 9 after flowing through the pump 18 and the second control valve 17b, where the cooler 9 is warmed-up.

During the storing mode shown in FIG. 4, the second control valve 17b is completely closed, thereby blocking tempering medium flow from the heating circuit 15 to the cooler 9 and from the engine cooling system 23 to the cooler 9. The first control valve 17a is positioned to block tempering medium flow from the container 11 to the EGR valve 10. As such, the tempering medium flows from the container 11, through the first control valve 17a, to the engine cooling system 23, where the tempering medium is warmed-up and returned to the container 11. As such, the tempering medium may recharge (e.g., warm-up) the heat storage medium 12. If the heat storage medium is a PCM, the heat storage medium may liquefy (e.g., melt), thereby configuring the heat storage medium 12 to heat the tempering medium during a future cold-start.

Figure 5:
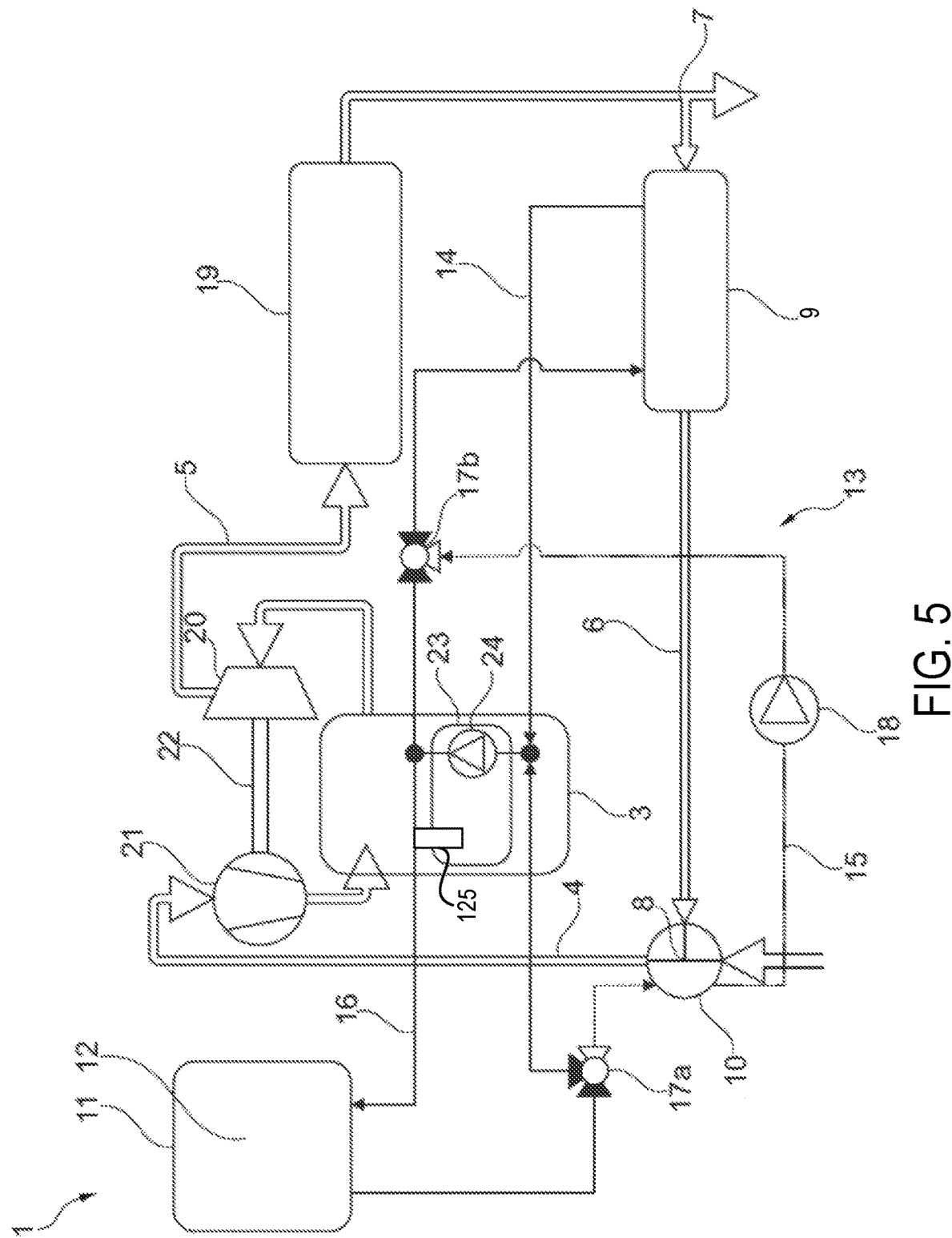
FIG. 5 shows the first exemplary arrangement in a further heat storage mode.

As shown in FIG. 5, a tempering medium stream may also be formed in the base circuit 14 together with the storage circuit 16, since after reaching the minimum temperature, not only can the heat storage medium 12 be recharged but EGR cooling via the cooler 9 may also be desired.

As such, FIG. 5 illustrates a combination mode including the storing mode and the cooling mode. The valve position of the first control valve 17a in the combination mode may be similar to the position of the first control valve 17a in the storing mode. However, the position of the second control valve in the combination mode is different than the position of the second control valve in the storing mode. In the combination mode, the second control valve 17b is positioned to allow the tempering medium to flow between the engine cooling circuit 23 and the cooler 9, similar to the cooling mode shown in FIG. 2. In this way, the combination mode blocks tempering medium from flowing to the heating circuit 15 and tempering medium does not flow to the EGR valve 10.

However, separate operation of the storage circuit 16 alone is also possible (see FIG. 4), for example if no exhaust gas recirculation is performed and consequently no cooling of the cooler 9 is desired. For this, for example, valve 17b may interrupt the coolant flow in the base circuit. Furthermore, the heat storage medium may be recharged, for example after the internal combustion engine 3 has been switched off and no more exhaust gas is formed, while the tempering medium is still sufficiently warm. For this, an additional pump (not shown) may be integrated in the storage circuit.

Figure 6:
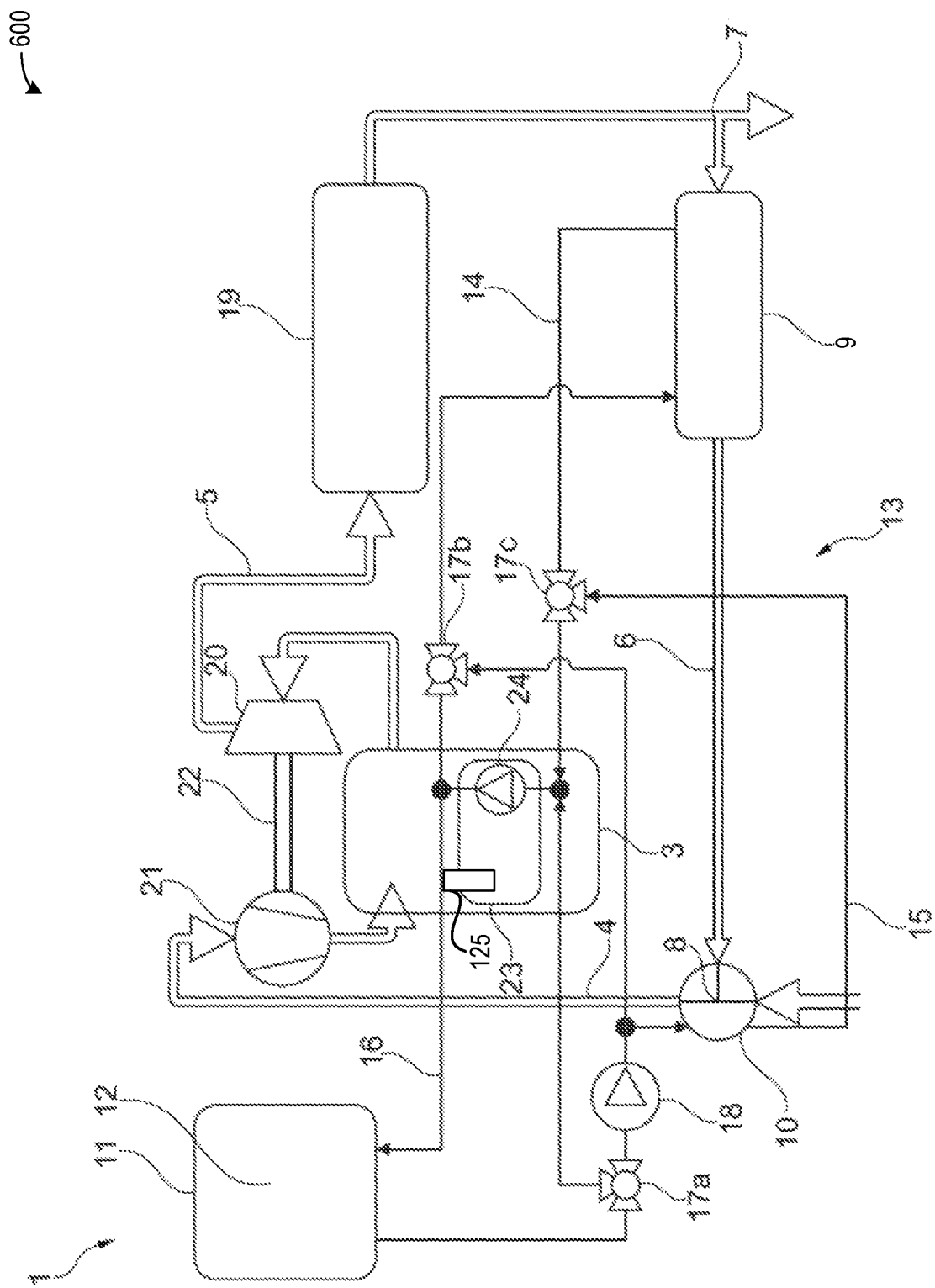
FIG. 6 shows a further exemplary arrangement with EGR valve and cooler arranged in parallel.

Turning now to FIG. 6, it shows a second exemplary arrangement 600 of the arrangement 1 for tempering the exhaust gas recirculation devices 2. In contrast to the arrangement 1 in FIG. 1, in the second exemplary arrangement 600, the EGR valve 10 and the cooler 9 are arranged in parallel with each other in the heating circuit 15. Otherwise, reference is made to the statements above relating to the arrangement 1.

The parallel arrangement of the EGR valve 10 and cooler 9 allows selective through-flow of only the EGR valve 10, only the cooler 9, or both the EGR valve 10 and the cooler 9. In this way, the tempering medium stream may be divided to the cooler 9 and the EGR valve 10 via the through-flow control devices 17b, 17c if heating of the cooler 9 and/or the EGR valve 10 is desired. In other words, the cooler 9 and the EGR valve 10 may be heated independently of each other. The through-flow control device 17c may herein be referred to as the third control valve 17c.

Figure 7:
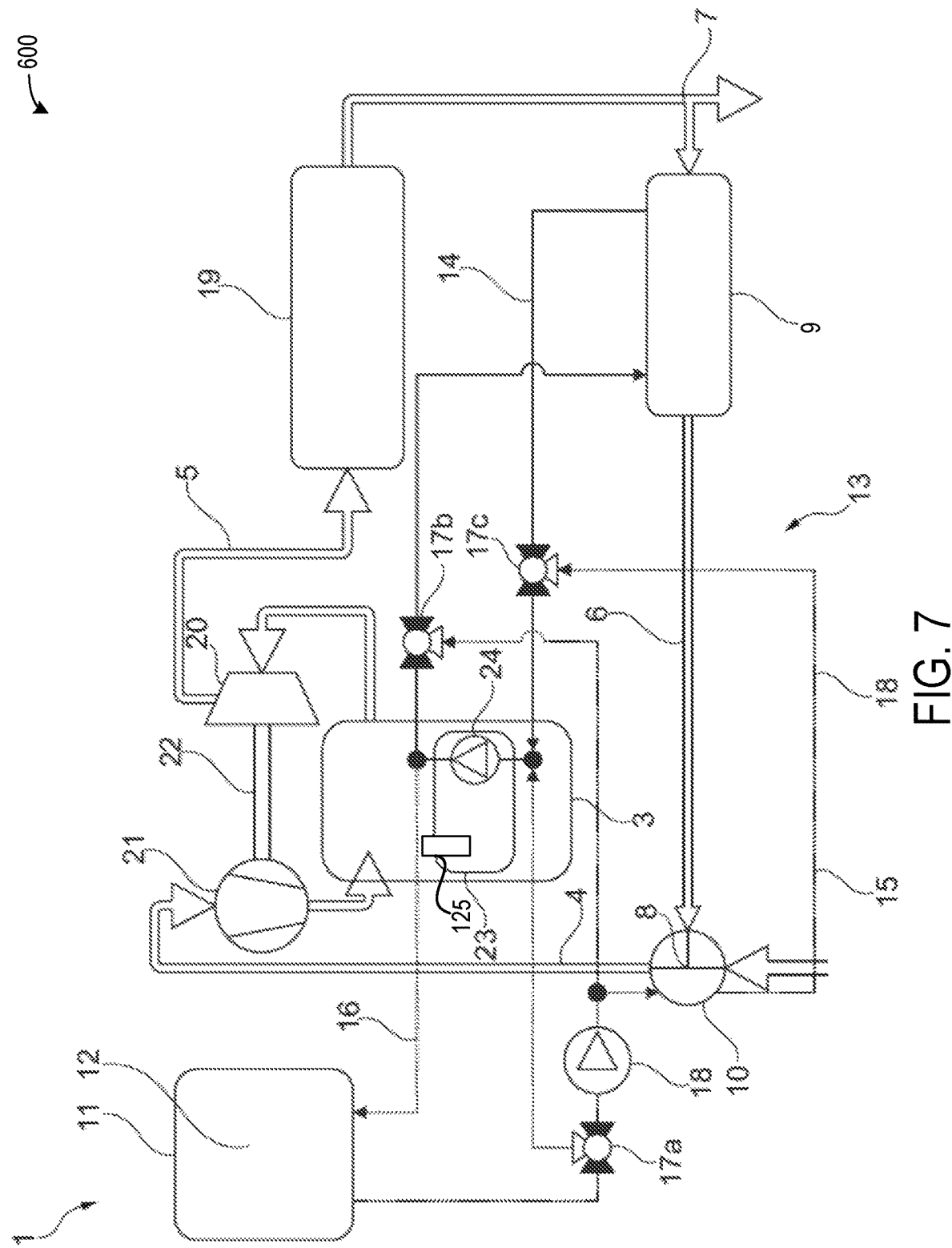
FIG. 7 shows the second exemplary arrangement in a cooling mode.

Turning now to FIG. 7, it shows the second exemplary arrangement 600 in a cooling mode. Here, only the base circuit 14 is active. The tempering medium flows from the engine cooling system 23 via the second control valve 17b to the cooler 9, and from there via the third control valve 17c back to the engine cooling system 23. Thus, the cooling mode of the second arrangement 600 is substantially similar to the cooling mode illustrated in FIG. 2, except that the third control valve is actuated to a position to allow the tempering medium to flow from the cooler 9 to the engine cooling system 23. As such, the cooling mode illustrated in FIG. 7 may block the tempering medium from flowing to the EGR valve 10 and the container 11.

Figure 8:
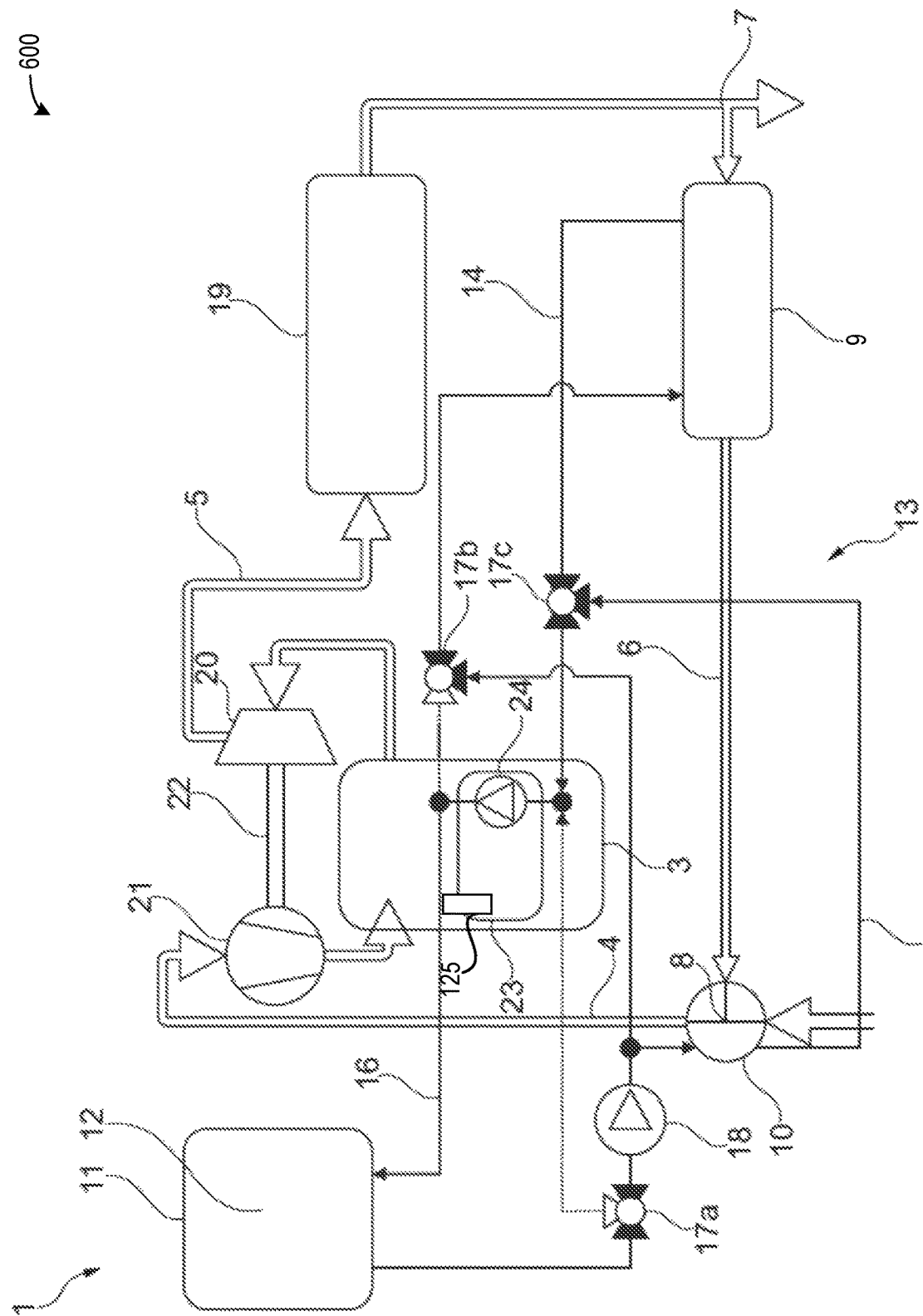
FIG. 8 shows the second exemplary arrangement in a heating mode.

Turning now to FIG. 8, it shows the second exemplary arrangement 600 in a heating mode. In the heating mode, the EGR valve 10 and/or the cooler 9 may be heated via a tempering medium stream in the heating circuit 15. The tempering medium flows from the container 11 via the first control valve 17a to the pumping device 18, and then—depending on the setting of the through-flow control devices 17b and 17c—to the EGR valve 10 and/or to the through-flow control device 17b and the cooler 9, and then via the through-flow control device 17c and the engine cooling system 23 back to the container 11.

Here, thermal energy is transferred from the heat storage medium 12 to the tempering medium so that the tempering medium warms up. Then, depending on the division of the tempering medium stream, the warmed tempering medium flows through the EGR valve 10 and/or the cooler 9 and then the internal combustion engine 3, before it returns to the container 11 and may again absorb thermal energy from the heat storage medium 12.

In some examples of the heating mode illustrated in FIG. 8, the tempering medium may be blocked from flowing to one of the EGR valve 10 or the cooler 9. For example, the first control valve 17a may be positioned to flow tempering medium to the EGR valve 10. The second control valve 17b may be positioned to block tempering medium from flowing from the pump 18 to the cooler 9. Tempering medium in the heating circuit 15 downstream of the EGR valve 10 may be blocked from flowing to the cooler 9 while being allow to flow to the engine cooling circuit 23 via the third control valve 17c. Additionally or alternatively, in another example of the heating mode, the tempering medium may be blocked from flowing to the EGR valve via a position of the first control valve 17a, while tempering medium may flow through the first control valve 17a to the engine cooling circuit 23 and to the cooler 9 via the second control valve 17b.

In one example of the heating mode, tempering medium flow to the EGR valve 10 is blocked if engine heating is prioritized. In another example, if engine heating is less desired, then the tempering medium flow may be directed to flow through the EGR valve 10 and the cooler 9 before flowing to the engine cooling circuit 23. Engine heating may be more desired if EGR is not desired and the engine is undergoing a cold-start. Engine heating may be less desired if EGR is desired and/or if condensate formation is likely and/or if the engine temperature is equal to a desired operating temperature.

Figure 9:
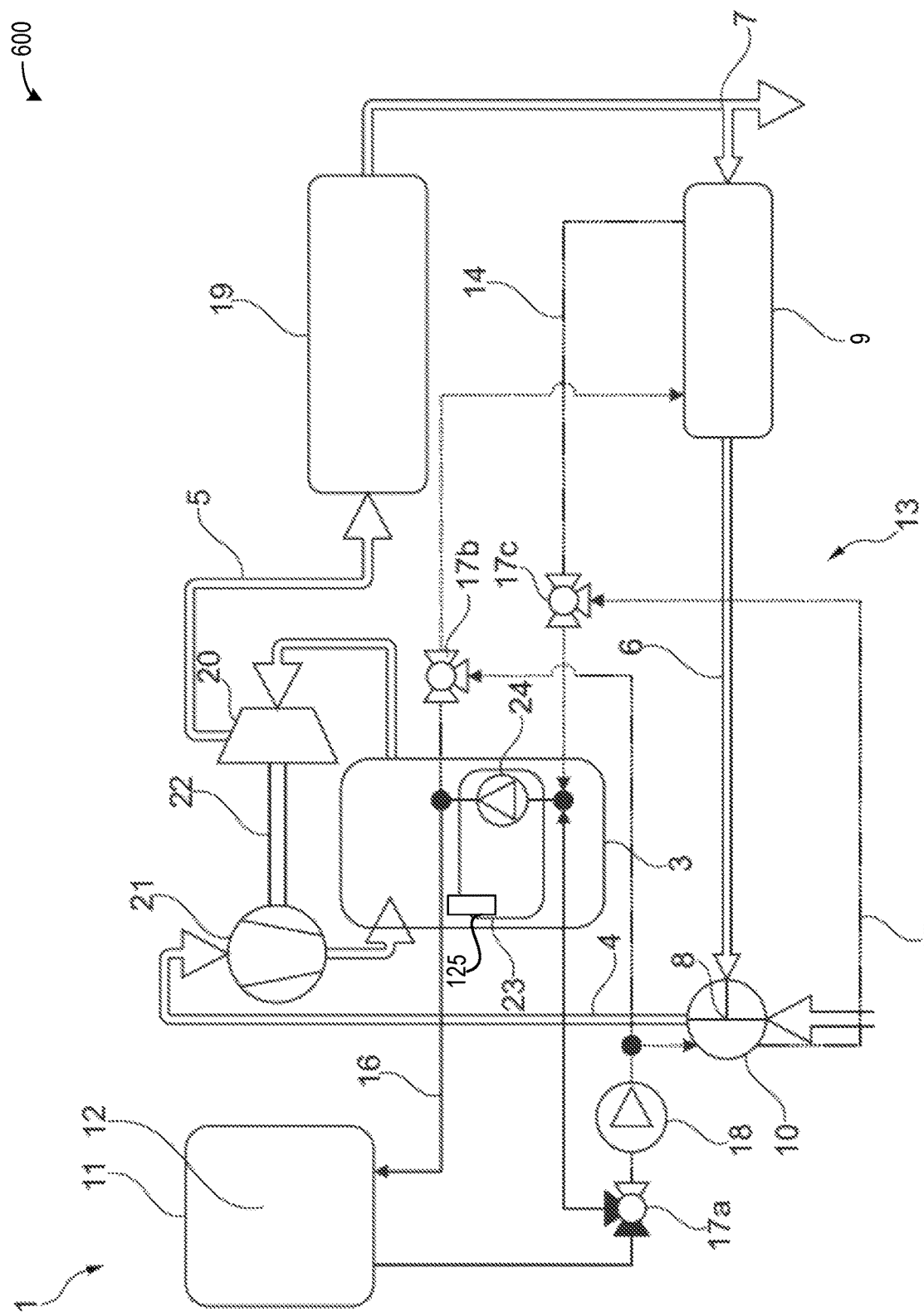
FIG. 9 shows the second exemplary arrangement in a heat storage mode.

When the internal combustion engine 3 reaches a minimum temperature, the heat storage medium 12 may then be recharged, as described with reference to FIG. 4 and as shown in FIG. 9 for the second exemplary arrangement 600.

Turning now to FIG. 9, it shows the second exemplary arrangement 600 in heat storage mode. When the internal combustion engine 3 reaches a minimum temperature, a tempering medium stream is formed in the storage circuit 16. In other words, the tempering medium flows through the engine cooling system 23 and the container 11.

In the storing mode, each of the second control valve 17b and the third control valve 17c are fully closed, thereby blocking tempering medium flow to the cooler 9. The first control valve 17a is positioned to allow tempering medium to flow from the container 11 to the engine cooling circuit 23 without flowing to the pump 18 or to the EGR valve 10.

Figure 10:
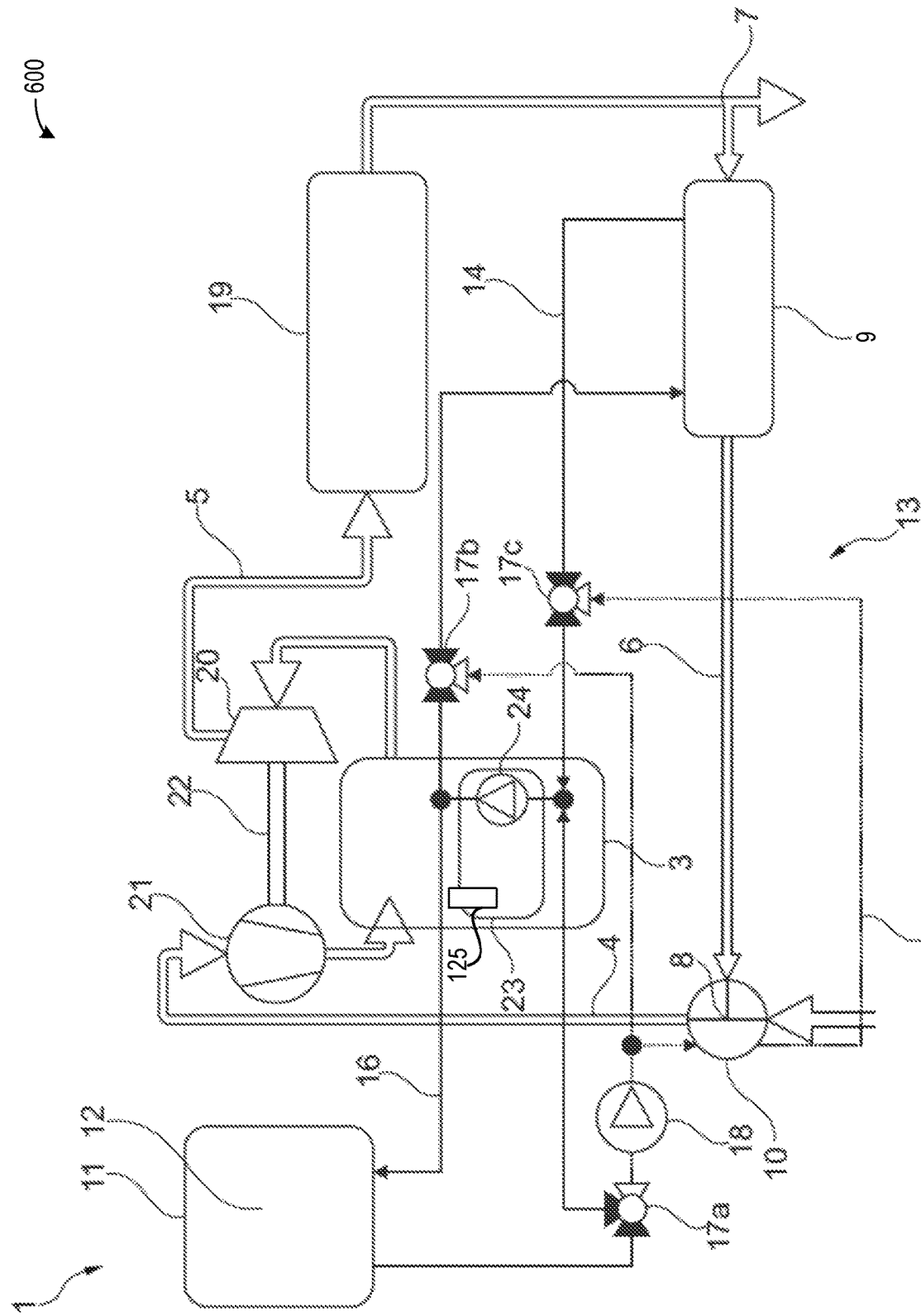
FIG. 10 shows the second exemplary arrangement in a further heat storage mode.
Figure 11:
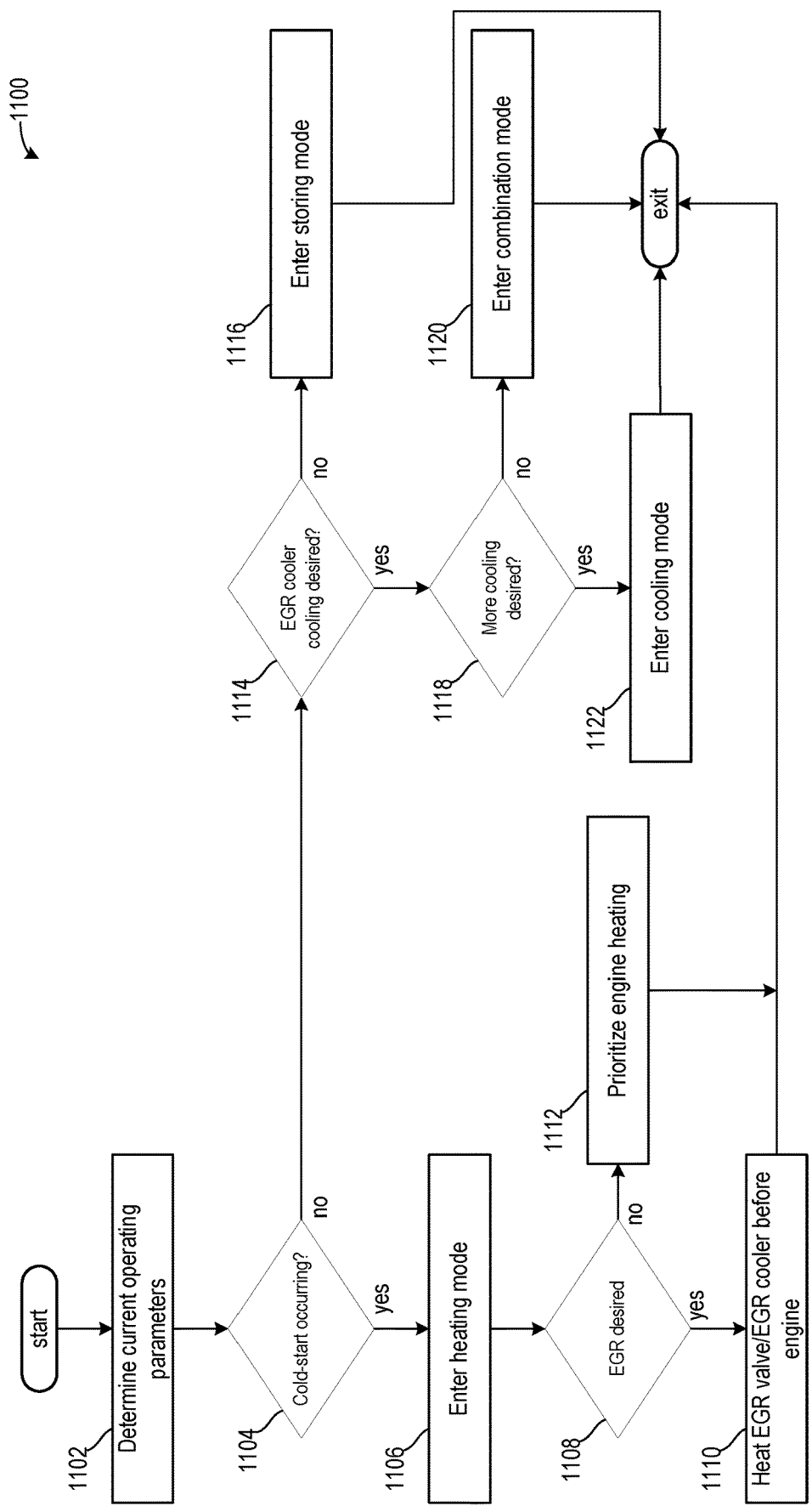
FIG. 11 shows a method for selecting a mode for a tempering circuit based on at least an engine temperature.

Turning now to FIG. 10, it shows a combination mode including the storing mode of FIG. 9 and the cooling mode of FIG. 7. Corresponding to FIG. 5, in the second exemplary arrangement 600 a tempering medium stream may be formed in the base circuit 14 and in the storage circuit 16 (FIG. 10), so that firstly the heat storage medium 12 is recharged and secondly the cooler 9 is cooled.

Turning now to FIG. 11, it shows a method 1100 for selecting a mode to direct the tempering medium flow. Instructions for carrying out method 1100 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 1100 begins at 1102, which includes determining current operating parameters. Current operating parameters may include but are not limited to one or more of a throttle position, manifold vacuum, engine temperature, engine speed, vehicle speed, EGR flow rate, and air/fuel ratio.

The method 1100 proceeds to 1104, which includes determining if a cold-start is occurring. The cold-start may be determined via feedback from a temperature sensor, such as temperature sensor 125 of FIGS. 1-10. The cold-start may be occurring if an engine temperature is less than an ambient temperature and/or a desired engine temperature (e.g., 90 degrees C.). If the cold-start is occurring, then the method 1100 proceeds to 1106, which includes entering a heating mode. During the heating mode, tempering medium may be directed to flow from a container comprising a heat storage medium to one or more of an EGR valve, an EGR cooler, and an engine. The heat storage medium may thermally communicate with and heat the tempering medium during the cold-start to accelerate a heating of the engine and/or the EGR valve and/or the EGR cooler.

The method 1100 proceeds to 1108, which includes determining if EGR is desired. If EGR is desired, then the heating mode may include heating the EGR valve and the EGR cooler before the engine. As such, a first control valve may be positioned to flow the tempering medium to the EGR valve, where the tempering medium then flow to the EGR cooler, and to the engine, before returning to the container and being reheated by the heat storage medium.

If EGR is not desired, then the method 1100 may proceed to 1112 following 1108, wherein the method 1100 comprises prioritizing engine heating at 1112. Engine heating may be prioritized by adjusting the first control valve to block tempering medium from flowing to the EGR valve. The second control valve and the third control valve are further adjusted to allow the tempering medium to flow between from the engine cooling system to the EGR cooler before returning to the container and being reheated by the heat storage medium.

In some examples, additionally or alternatively, engine heating may not be prioritized if the engine is near its desired operating temperature and a condensate formation risk of the EGR valve and the EGR cooler is relatively high. As such, heating of the EGR valve and the EGR cooler may be prioritized.

Returning to 1104, if the cold-start is not occurring, then the method 1100 proceeds to 1114 to determine if EGR cooler cooling is desired. In one example, EGR cooler cooling is desired if LP-EGR is flowing to the intake gas tract. As another example, EGR cooler cooling may be desired if an engine temperature is above a desired operating temperature, wherein the desired operating temperature is a range and the engine temperature is equal to a temperature greater than an upper end of the range.

If EGR cooling is not desired, which may occur when EGR is not desired or if the engine temperature is at a lower end of the range, then the method 1100 proceeds to 1116 which includes entering a storing mode. As such, the second and third control valves are adjusted to fully closed positions and the first control valve is adjusted to allow tempering medium to flow between the container and the engine cooling circuit without flowing to the EGR valve and the EGR cooler. In this way, the tempering medium may heat the heat storage medium in the container, thereby recharging the heat storage medium.

If EGR cooler cooling is desired, then the method 1100 proceeds to 1118, which includes if more cooling is desired. If more cooling is not desired, then the method 1100 proceeds to 1120, which includes entering a combination mode. The combination mode including a combination of the cooling mode and the storing mode. As such, the first, second, and third control valve may be positioned to allow tempering medium to flow from the container to the engine cooling circuit, and from the engine cooling circuit to the EGR cooler without flowing tempering medium to the EGR valve.

If more cooling is desired (e.g., a maximum amount of cooling), then the method 1100 proceeds to 1122 to enter the cooling mode. As such, the second and third control valves are positioned to allow tempering medium to flow between the engine cooling circuit and the EGR cooler and the first control valve is positioned to block tempering medium from flowing to the EGR valve and/or the engine cooling circuit from the container. As such, tempering medium in the container may not exit, thereby blocking other portions of the tempering medium from entering the container.

In this way, a circuit may be shaped to selectively heat and/or cool an EGR valve, an EGR cooler, and an engine. The circuit may comprise a plurality of valves to adjust flow of a tempering medium from a container with a heat storage medium or from the engine to various portions of the circuit. The technical effect of heating the EGR valve and the EGR cooler during a cold-start is to mitigate and/or block condensate formation therein, which may enhance engine operating parameters and mitigate degradation to a compressor blade.

In one embodiment, an arrangement for tempering exhaust gas recirculation devices, comprising an internal combustion engine with an engine cooling system for tempering the internal combustion engine, an intake air tract for supplying intake air to the internal combustion engine, an exhaust gas tract for discharging exhaust gas from the internal combustion engine, a low-pressure exhaust gas recirculation tract configured to recirculate exhaust gas from an exhaust gas extraction point arranged in the exhaust gas tract to an exhaust gas introduction point arranged in the intake air tract, a cooler arranged in the low-pressure exhaust gas recirculation tract as an exhaust gas recirculation device, a valve for controlling the composition of a mixture of fresh air and recirculated exhaust gas forming the intake air, designated below as the EGR valve, as an exhaust gas recirculation device, a container with a heat storage medium, a tempering circuit through which tempering medium flows, comprising a base circuit in which the cooler and the engine cooling system are arranged, a heating circuit through which tempering medium flows and in which the cooler, the EGR valve, the engine cooling system and the container are arranged, and a storage circuit through which tempering medium flows and in which the container and the engine cooling system are arranged, and through-flow control devices configured to divide the tempering medium stream to the base circuit, the heating circuit and the storage circuit.

A first example of the arrangement further comprises where the cooler and the EGR valve are arranged successively in series or in parallel to each other in the heating circuit.

A second example of the arrangement further comprises where the heat storage medium is a latent heat storage medium.

A third example of the arrangement optionally including any of the above examples, further includes where the latent heat storage medium may be present in a metastable state below its phase transition temperature.

A fourth example of the arrangement optionally including any of the above examples, further includes where a pumping device (18) is arranged in the heating circuit (15).

A fifth example of the arrangement optionally including any of the above examples, further includes temperature sensors for determining the temperature of the cooler and/or of the EGR valve and/or of the internal combustion engine.

A sixth example of the arrangement optionally including any of the above examples, further includes where a control unit is configured to output control signals to the through-flow control devices depending on the temperature of the cooler and/or the temperature of the EGR valve and/or the temperature of the internal combustion engine.

An embodiment of a method for tempering exhaust gas recirculation devices of the arrangement of any of the above examples comprises formation of a tempering medium stream in the base circuit when cooling of the cooler is desired, and formation of a tempering medium stream in the heating circuit when heating of the cooler and/or of the EGR valve is desired.

A first example of the method further comprises where formation of a tempering medium stream in the storage circuit when a minimum temperature of the internal combustion engine is reached.

A second example of the method, optionally including the first example further includes when heating of the cooler and/or of the EGR valve is desired, the tempering medium stream is divided to the cooler and to the EGR valve.

A third example of the method optionally including any of the above examples further includes where the tempering medium stream is formed via a pumping device.

An alternative embodiment wherein the arrangement is included in a hybrid vehicle.

Although the disclosure has been illustrated and described in detail with reference to the preferred exemplary embodiments, the disclosure is not restricted by the examples disclosed and other variations may be derived by the person skilled in the art without leaving the scope of protection of the disclosure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a tempering circuit for flowing a tempering medium from a container to an engine cooling circuit, an EGR cooler, and an EGR valve.

2. The system of claim 1, wherein the tempering circuit comprises a base circuit, a heating circuit, and a storing circuit, wherein the base circuit is fluidly coupled to the engine cooling circuit and the EGR cooler, wherein the heating circuit is fluidly coupled to the EGR valve and the EGR cooler, wherein the storing circuit is fluidly coupled to the engine cooling circuit and the container.

3. The system of claim 1, wherein the tempering circuit comprises a first control valve, a second control valve, and a third control valve for partitioning tempering medium flow to each of the container, the engine cooling circuit, the EGR cooler, and the EGR valve.

4. The system of claim 1, wherein the container comprises a heat storing medium, and where the tempering medium is heated by the heat storing medium during a cold-start of an engine, and where the tempering medium heats the heat storing medium outside of the cold-start.

5. The system of claim 1, wherein the EGR valve and the EGR cooler are arranged in series along the tempering circuit.

6. The system of claim 1, wherein the EGR valve and the EGR cooler are arranged in parallel along the tempering circuit.

7. The system of claim 6, wherein during a first condition of a heating mode, the tempering medium flows to each of the EGR valve and the EGR cooler, during a second condition of the heating mode, the tempering medium flows to only the EGR valve and not to the EGR cooler, and during a third condition of the heating mode, the tempering medium flows to only the EGR cooler and not the EGR valve.

8. The system of claim 7, wherein the heating mode is selected during a cold-start of an engine.

9. A vehicle system, comprising:
an engine comprising an engine cooling circuit;
an exhaust-gas passage shaped to receive exhaust gas from the engine, wherein an exhaust-gas recirculation (EGR) passage branches from the exhaust-gas passage and directs exhaust-gas to an intake passage shaped to flow gases to the engine, wherein the EGR passage comprises a cooler and an EGR valve;
a container comprising a heat storing medium;
a tempering circuit fluidly coupled to each of the container, the engine cooling circuit, the cooler, and the EGR valve; and
a controller with computer-readable instructions stored on non-transitory memory thereof that when executed enable the controller to:
flow a tempering fluid to each of the container, the engine cooling circuit, the cooler, and the EGR valve during a heating mode;
flow the tempering fluid to only the engine cooling circuit and the cooler during a cooling mode;
flow the tempering fluid to only the container and the engine cooling circuit during a storing mode; and
flow the tempering fluid to only the container, the engine cooling circuit, and the cooler during a combination mode.

10. The vehicle system of claim 9, wherein the tempering circuit is divided into a base circuit, a heating circuit, and a storing circuit.

11. The vehicle system of claim 10, wherein the heating mode comprises flowing the tempering fluid through each of the base circuit, the heating circuit, and the storing circuit.

12. The vehicle system of claim 10, wherein the cooling mode comprises flowing tempering fluid through only the base circuit.

13. The vehicle system of claim 10, wherein the storing mode comprises flowing tempering fluid through only the storing circuit.

14. The vehicle system of claim 10, wherein the combination mode comprises flowing tempering fluid through the storing circuit and the base circuit.

15. The vehicle system of claim 10, wherein the base circuit is fluidly coupled to the engine cooling circuit and the cooler, wherein the heating circuit is fluidly coupled to the EGR valve and the cooler, wherein the storing circuit is fluidly coupled to the engine cooling circuit and the container.

16. The vehicle system of claim 10, further comprising a first control valve for adjusting tempering fluid flow from the storage container to the EGR valve and the engine cooling circuit, a second control valve for adjusting tempering fluid flow from the engine cooling circuit to the cooler, and a third control valve for adjusting tempering fluid flow from the storage container to the cooler.

17. A method comprising:
flowing a tempering medium during a heating mode through a tempering circuit fluidly coupled to an engine cooling circuit, an EGR valve, and an EGR cooler during an engine cold-start;
flowing the tempering medium during a storing mode from the engine cooling circuit to a container housing a heat storage medium outside of the engine cold-start; and
flowing the tempering medium during a cooling mode between the engine cooling circuit and the EGR cooler outside the engine cold-start when EGR is desired.

18. The method of claim 17, wherein the tempering medium is directed to the EGR valve during the heating mode if one or more of EGR is desired or the engine temperature is above a lower temperature of a range, wherein the tempering medium does not flow to the EGR valve during the heating mode if EGR is not desired and the engine temperature is less than the lower temperature of the range.

19. The method of claim 17, wherein the heating mode further comprises flowing the tempering fluid to only the EGR valve and not the EGR cooler, to only the EGR cooler and not the EGR valve, and to both the EGR valve and the EGR cooler.

20. The method of claim 17, further comprising a combination mode comprising each of the cooling mode and the storing mode.

* * * * *